W. F. DOLL.
RESILIENT WHEEL.
APPLICATION FILED DEC. 27, 1912.

1,091,304.

Patented Mar. 24, 1914.

Witnesses

Inventor
William F. Doll
By C. J. Stockman
Attorney

UNITED STATES PATENT OFFICE.

WILLIAM F. DOLL, OF NEW YORK, N. Y., ASSIGNOR OF ONE-HALF TO LEE McCLUNG, OF WASHINGTON, DISTRICT OF COLUMBIA.

RESILIENT WHEEL.

1,091,304.  Specification of Letters Patent.  Patented Mar. 24, 1914.

Application filed December 27, 1912. Serial No. 738,860.

*To all whom it may concern:*

Be it known that I, WILLIAM F. DOLL, a citizen of the United States, residing in Manhattan borough, in the city and county of New York and State of New York, have invented new and useful Improvements in Resilient Wheels, of which the following is a specification.

This invention relates to certain improvements in spring hubs for wheels and the like, including, for example, automobile wheels, truck wheels, motorcycle wheels, bicycle wheels, carriage wheels, wagon wheels, gear wheels, pulleys, etc.; and the invention consists in certain peculiarities in the construction and arrangement of parts, and in certain novel combinations of elements, substantially as hereinafter described and particularly pointed out in the subjoined claims.

Figure 1:
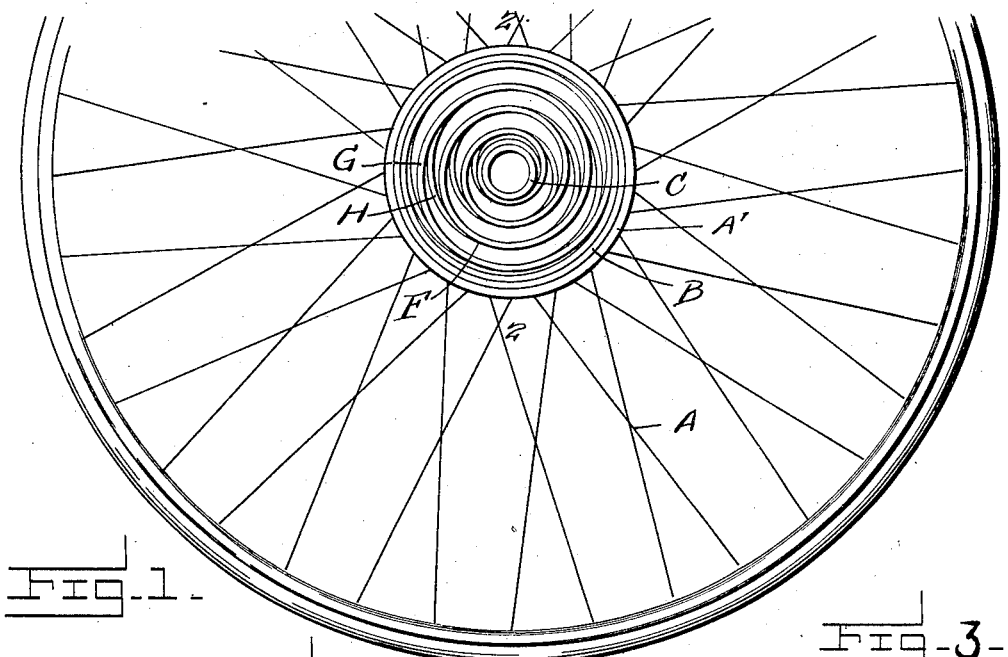
Figure 2:
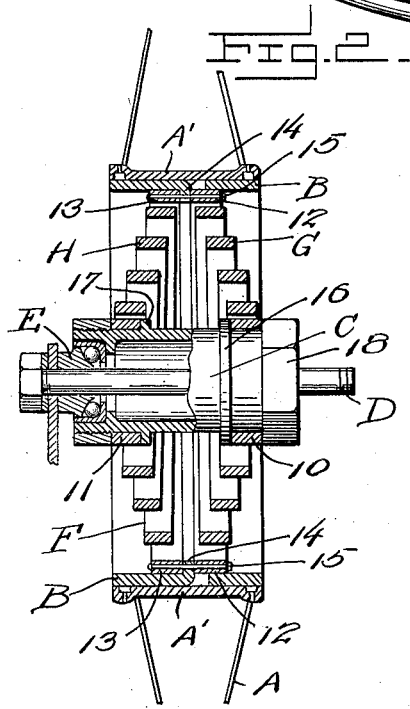
Figure 3:
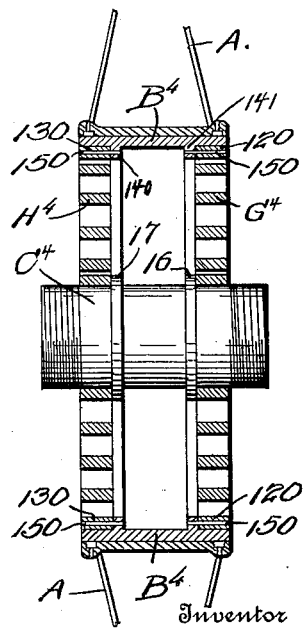

In the accompanying drawings, wherein like characters of reference denote similar parts in the several views: Figure 1 is a side elevation of a part of a wheel having a spring hub embodying the present improvements. Fig. 2 is a vertical transverse section on the line 2—2 of Fig. 1; Fig. 3 is a similar sectional view, showing another modified form of spring.

The body or spoke portion A of the wheel herein shown is of the wire-spoke type, but this is not essential, being selected merely as being exemplary of a style of wheel in which my present spring-hub may be practically embodied. The present hub may, as is obvious, be embodied in wheels of many different types, including as further examples, those in which the spokes are made of wood, and those in which the spoke-portions are formed of spirally-coiled members, examples of the last named type being illustrated in my applications for Letters Patent of the United States numbered 671,846 (filed Jan. 18, 1912) and 629,003 (filed May 23, 1911) and also in my applications, numbered 738,858 and 738,859 respectively which are executed of even date herewith.

Referring now particularly to the preferred construction illustrated best in Fig. 2 of the drawings, B designates a ring or band which is tightly fitted in the ring or band A' of the body portion of the wheel and C designates the axial member or bearing sleeve of the hub or wheel. The axial member C is hollow for the passage of the axle or shaft D therethrough and the particular form thereof herein illustrated is provided with cone-bearings E. These bearings are not essential to the present invention and when employed may be of any suitable construction. It is considered to be unnecessary to describe them in detail, as suitable forms thereof are well known.

Between the bearing sleeve C and the band or ring B the spring member F of the present hub is arranged. The preferred form of this spring-member, shown in Fig. 2, comprises two spirally-coiled springs marked G and H respectively. The inner convolutions 10 and 11 of these springs embrace the bearing sleeve C and their outermost convolutions 12 and 13, which are approximately of circular form, are arranged side by side and on opposite sides of a means 14 which projects inwardly from the ring or band B. This means 14 serves to prevent inward lateral displacement of the springs, and outward lateral displacement of said springs is preferably prevented by securing the outer convolutions 12 and 13 to said inwardly projecting means. This also causes unitary movement of the springs G and H, as is apparent. Preferably, the means for fastening the outer convolutions 12 and 13 to the part 14 consists of bolts and nuts 15 but any suitable form of fastening means may be resorted to. It will be understood that the bolts and nuts are spaced apart along the lengths of the outermost or circumferential circular convolutions of the coils, there being a sufficient number of the fastening means employed to insure proper connection of said convolutions with each other and with the band or ring B. The inwardly projecting means 14 hereinbefore referred to is herein exemplified as being lugs struck inwardly from the body of the ring or band B but any other suitable inwardly projecting means may be employed if desired.

To prevent inward lateral displacement of the innermost convolutions 10 and 11 of the springs G and H the bearing sleeve C is shown as being provided with outward projections 16 and 17, each of which preferably extends annularly around said sleeve. These projections are suitably spaced apart and form stops against which the inner side surfaces of the convolutions 10 and 11 bear. Nuts 18 and 19 threaded on the ends of the bearing sleeve C, or other suitable means, are employed to clamp said convolutions 10 and 11 against the projections 16 and 17 and to restrain outward lateral displacement of the same.

As is most clearly shown in Fig. 1 the convolutions of the spirally-coiled springs G and H extend from the bearing sleeve C in relatively reverse directions, that is to say, the spring G is coiled from the sleeve C in a direction the reverse of that in which the coils of the spring H extend from said sleeve: and it will be noted upon reference to Fig. 2 that the springs G and H converge outward from the bearing sleeve C to the ring or band B and that the springs are arranged equally on opposite sides of a vertical plane which intersects the center of the wheel.

The construction thus described provides a spring hub which is equally resilient in all directions, and whose parts may be economically manufactured and readily and easily assembled, and also provides one wherein the center of mass is at the center of the hub.

Fig. 3 exemplifies a construction in which two separate springs marked $G^4$ and $H^4$ respectively, each of construction identical with the springs G and H are so disposed that their outermost convolutions 120 and 130 are spaced farther apart than are the corresponding convolutions of the coils G and H. This relative arrangement of the springs may be preferred in some instances. In such case, the encircling ring or band, marked $B^4$ is preferably provided with inwardly spaced projections marked 140 and 141 to which the convolutions 120 and 130 of the springs $G^4$ and $H^4$ are respectively secured by bolts 150 or other suitable fastening means. In other respects the construction shown in this figure may be identical with that shown in Fig. 2. The springs $G^4$ and $H^4$ are illustrated in Fig. 3 as being arranged in a vertical plane but they may converge from the sleeve, marked $C^4$ in this figure, in a manner analogous to that described with reference to Fig. 2, if preferred.

Having now described the invention what I believe to be new and desire to secure by Letters Patent, is:—

1. A spring hub having separately-formed, reversely-coiled spiral springs whose circumferential convolutions are approximately of circular form, an inner ring arranged in the axial convolutions of said springs and having means for maintaining them in spaced relation, and an outer ring encircling the circumferential convolutions of the springs and having inwardly extending means fixedly secured to said circumferential convolutions at intervals.

2. A spring hub having separately-formed springs arranged side by side, and whose circumferential convolutions are approximately of circular form, an inner ring arranged in the axial convolutions of said springs and having means for maintaining them in spaced relation, an outer ring encircling the circumferential convolutions of the springs and having inwardly-extending lugs at intervals, and fastening elements for securing the circumferential convolutions of the springs to said lugs.

3. A spring hub having separately-formed springs arranged side by side and whose circumferential convolutions are approximately of circular form, an inner ring arranged in the axial convolutions of said springs and having means for maintaining them in spaced relation, an outer ring encircling the circumferential convolutions of the springs and having inwardly-extending lugs struck from the body of the ring and arranged at intervals, and fastening elements for securing the circumferential convolutions of the springs to said lugs.

4. A spring hub having separately-formed, reversely-coiled spiral springs which converge from their axial convolutions to their circumferential convolutions, the latter convolutions of the springs being approximately of circular form, an inner ring arranged in the axial convolutions of the springs and having means for maintaining the same in spaced relation, an outer ring encircling the circumferential convolutions of the springs and provided with inwardly extending means arranged between the latter, and means for securing the circumferential convolutions to the said inwardly extending means, comprising fastening elements extending laterally through the same and arranged at intervals around the hub.

In testimony whereof I have hereunto set my hand in presence of two subscribing witnesses.

WILLIAM F. DOLL.

Witnesses:
JOHN J. RANAGAN,
ISABEL R. RICHARDS.

---

Copies of this patent may be obtained for five cents each, by addressing the "Commissioner of Patents, Washington, D. C."